United States Patent
Park et al.

(10) Patent No.: US 9,766,501 B2
(45) Date of Patent: Sep. 19, 2017

(54) LIQUID CRYSTAL DISPLAY DEVICE AND METHOD OF MANUFACTURING THE SAME

(71) Applicant: LG Display Co., Ltd., Seoul (KR)

(72) Inventors: SeungRyull Park, Goyang-si (KR); HyunJin Park, Paju-si (KR); JinPil Kim, Paju-si (KR); Han Jin Ahn, Seoul (KR); Hanseok Lee, Seoul (KR); Su-Bin Lee, Busan (KR)

(73) Assignee: LG Display Co., Ltd., Seoul (KR)

( * ) Notice: Subject to any disclaimer, the term of this patent is extended or adjusted under 35 U.S.C. 154(b) by 388 days.

(21) Appl. No.: 14/307,237

(22) Filed: Jun. 17, 2014

(65) Prior Publication Data

US 2014/0368775 A1     Dec. 18, 2014

Related U.S. Application Data

(60) Provisional application No. 61/835,773, filed on Jun. 17, 2013.

(30) Foreign Application Priority Data

Dec. 30, 2013   (KR) .................. 10-2013-0167917

(51) Int. Cl.
    *G02F 1/1337*     (2006.01)
    *G02F 1/1343*     (2006.01)
    *G02F 1/137*      (2006.01)

(52) U.S. Cl.
    CPC .. *G02F 1/133788* (2013.01); *G02F 1/133723* (2013.01); *G02F 1/134363* (2013.01);
    (Continued)

(58) Field of Classification Search
    CPC ......... G02F 1/133723; G02F 1/133788; G02F 1/134363; G02F 2001/134372;
    (Continued)

(56) References Cited

U.S. PATENT DOCUMENTS

2002/0186330 A1   12/2002   Kawasaki
2003/0112393 A1    6/2003   Watanabe et al.
(Continued)

FOREIGN PATENT DOCUMENTS

JP   2006-350347 A   12/2006
JP   2012-113212 A    6/2012
(Continued)

OTHER PUBLICATIONS

PCT International Search Report for PCT/KR2014/005311, Oct. 10, 2014, 3 Pages.
(Continued)

*Primary Examiner* — Sophie Hon
(74) *Attorney, Agent, or Firm* — Fenwick & West LLP

(57) ABSTRACT

An alignment film for liquid crystal display device includes a first portion positioned towards to the liquid crystal layer and a second portion positioned away from the liquid crystal layer. The first portion provides improved anchoring force while the second portion exhibits a lower volume resistance than the first portion. Thus, AC image sticking and DC image sticking can be minimized at the same time.

14 Claims, 6 Drawing Sheets

(52) U.S. Cl.
CPC .............. *G02F 2001/13712* (2013.01); *G02F 2001/134372* (2013.01); *Y10T 428/1018* (2015.01); *Y10T 428/1023* (2015.01)

(58) Field of Classification Search
CPC ..... G02F 2001/13712; Y10T 428/1018; Y10T 428/1023
See application file for complete search history.

(56) References Cited

U.S. PATENT DOCUMENTS

| | | | |
|---|---|---|---|
| 2004/0170777 A1* | 9/2004 | Tomioke | G02F 1/1337 428/1.2 |
| 2006/0061719 A1* | 3/2006 | Tomioka | G02F 1/133723 349/123 |
| 2010/0066961 A1* | 3/2010 | Matsui | G02F 1/133723 349/129 |
| 2011/0115999 A1 | 5/2011 | Uchino et al. | |
| 2011/0199565 A1* | 8/2011 | Kunimatsu | G02F 1/133723 349/123 |
| 2011/0221984 A1* | 9/2011 | Matsumori | G02F 1/133723 349/33 |
| 2012/0135661 A1 | 5/2012 | Imanishi et al. | |
| 2012/0172522 A1 | 7/2012 | Shin et al. | |
| 2012/0298989 A1 | 11/2012 | Fujii | |
| 2014/0218667 A1 | 8/2014 | Miyachi et al. | |

FOREIGN PATENT DOCUMENTS

| | | | | |
|---|---|---|---|---|
| JP | 2013-101206 A | 5/2013 | | |
| KR | 2000-0012071 A1 | 2/2000 | | |
| KR | 10-2008-0062852 A | 7/2008 | | |
| KR | WO 2008153287 A1 * | 12/2008 | ............ | C08G 73/10 |
| KR | 2010/0062923 A | 6/2010 | | |
| KR | 10-2012-0029602 A | 3/2012 | | |
| KR | 2012-0138023 A | 12/2012 | | |
| KR | 10-2013-0050862 A | 5/2013 | | |
| TW | 201113155 A | 4/2011 | | |
| WO | WO 2013/024749 A1 | 2/2013 | | |
| WO | WO 2013/039168 A1 | 3/2013 | | |

OTHER PUBLICATIONS

Office Action for Taiwanese Patent Application No. TW 103120862, Aug. 31, 2015, 5 Pages.
European Search Report for European Patent Application No. EP 14814005.6, Dec. 2, 2016, 10 Pages.
Office Action for Korean Patent Application No. 10-2015-7032119, Apr. 18, 2016, 7 Pages.
Chen, Y., "High Performance Negative Dielectric Anistropy Liquid Crystals for Display Applications," Crystals, 2013, pp. 483-503.

* cited by examiner

LIQUID CRYSTAL DISPLAY DEVICE AND METHOD OF MANUFACTURING THE SAME

CROSS-REFERENCE TO RELATED APPLICATIONS

This application claims priority under 35 U.S.C. §119(e) to U.S. Provisional Patent Application No. 61/835,773 filed on Jun. 17, 2013 and under 35 U.S.C. §119(a) to Korean Patent Application No. 10-2013-0167917 filed on Dec. 30, 2013, both of which are incorporated herein by reference.

BACKGROUND OF THE INVENTION

1. Field of the Invention

The present disclosure generally relates to a display device, and more particularly to a liquid crystal display (LCD) device including a photo-alignment film and a method for manufacturing the same.

2. Description of the Related Art

Unlike twisted nematic (TN) liquid crystal displays, in in-plane-switching (IPS) liquid crystal displays, the electrodes for generating electrical fields to control the liquid crystal (LC) are on a single substrate in the form of strip electrodes. With this electrode arrangement, electric field-induced molecular reorientation occurs mainly in the horizontal direction, providing much lower viewing angle dependence than in TN and vertical alignment (VA) LCD devices. Further, LCD devices having the fringe-field-switching (FFS) mode, which is a more advanced version of the IPS technology, have narrower electrode width and gap so that the areas above the electrodes can also contribute to the switching process.

Positive dielectric anisotropy LC has been commonly used in both IPS mode and FFS mode LCD devices. However, most IPS mode and FFS mode LCD devices have a structure in which the distance between the pixel electrode and common electrode is greater than the cell gap. In such a configuration, strong vertical electric fields tend to form above the electrode surfaces. When the positive type liquid crystal is used, such vertical electric fields can cause tilt rather than twist of the liquid crystal material, leading to insufficient phase retardation. This can severely hamper the peak light transmittance at a certain frame, which in turn causes an asymmetrical brightness between the frames.

Recently, it has been found that employing negative dielectric anisotropy LC in the FFS mode LCD device has several advantages over the positive dielectric anisotropy LC, such as higher transmittance, single gamma curve, lower cell gap dependence and weaker flexo-electric effect. Nevertheless, several technical challenges remain in perfecting the use of negative dielectric anisotropy LC in the LCD devices.

SUMMARY OF THE INVENTION

Prior attempts in perfecting the use of the negative dielectric anisotropy LC in IPS mode and/or FFS mode LCD devices have been mainly focused on the LC material itself. However, inventors of the embodiments in the present disclosure have recognized that employing an alignment film that is optimized for negative dielectric anisotropy LC can greatly improve the performance and reliability of the IPS mode and/or FFS mode LCD devices using the negative dielectric anisotropy LC.

Most LCD devices require an alignment film on one or both sides of the LC layer to control the orientation of the LC. The alignment film can be imparted with anchoring force by a contact-type alignment process. For instance, liquid crystal aligning capability can be provided by physically rubbing the alignment film with cloth such as rayon cloth. However, such a process can create scratches and declination at a stepped portion of a thin-film transistor pattern, which may cause image blurring, image sticking, as well as the color shifting problems. The contact-type alignment process may also cause unwanted static electricity generation that can lead to various undesired effects on the components employed in the display device. Further, the static electricity may cause dusts to be adhered to the surface of an alignment film, leading to variety of display defects.

A pre-tilt angle for the LC molecules is not needed in the IPS mode and FFS mode LCD devices as the LC molecules are aligned and operated parallel to the substrate. Accordingly, a photo-alignment process is well suited method for imparting anisotropy in the alignment film employed in IPS/FFS mode LCD devices. By using the photo-alignment process, several issues involved in the contact-type alignment process can be eliminated.

In the photo-alignment process, an alignment film made of a synthetic polymer (e.g., polyimide) is irradiated by polarized ultraviolet (UV) light to provide uniaxial anisotropy in a direction perpendicular to the polarization direction. By irradiating the polymer, the main chain of the polymer is cleaved in a direction parallel to the polarization direction. This makes the LC molecules to be aligned along the orientation of the long main chains that remain continuous without being cleaved. Using the conventional photo-alignment polymer and process, however, the anchoring force of the alignment film may not be as strong as that of the contact-type alignment film.

The anchoring force of the alignment film facilitates recovery of LC molecules back to their initial alignment direction. Without sufficient anchoring force in the alignment film, the LC molecules may lose its original alignment direction, especially if a specific pattern is displayed on a LCD device for an extended time. In such cases, the previously displayed image can remain visible in the screen, which is known as the "AC image sticking."

Increase in the molecular weight of the alignment film equates to more interaction site with LC, and this provides improved anchoring force in the alignment film. As such, increase in the molecular weight of the alignment film can suppress the AC image sticking problem in the LCD devices. Given that polymers with diverse molecular weights exist in the alignment film, the molecular weight of the alignment film can be evaluated in terms of a weight average molecular weight.

High imidization rate in the precursor for the alignment film yields higher average molecular weight in the resulting alignment film. The constituent material of the alignment film, polyimide (PI), is obtained when the polyamic acid (PAA) is heated at certain temperature to cause intramolecular condensation reaction. During this process, however, a reverse reaction can occur in the polyamic acid. As such, some polyamic acid becomes polyimide by the imidization reaction while some reverse back to diamine and dianhydride. Accordingly, it is very difficult to achieve a high imidization rate using only the polyamic acid, and makes it difficult to obtain an alignment film with a sufficiently high weight average molecular weight.

It has been contemplated that adding polyamic acid ester (PAE) in the precursor for the alignment layer can yield higher imidization rate as the polyamic acid ester generally do not undergo the reverse reaction as the polyamic acid.

However, adding the polyamic acid ester may result in weakening of the alignment film. Further, increases in the time necessary for achieving a sufficient imidization ratio in the alignment film for sufficient imidization correlates with the amount of the polyamic acid ester in the precursor mixture. As such, the manufacturing time for LCD devices can become unacceptably long.

Unlike the aforementioned precursor materials, the inventors of the embodiments in the present disclosure recognized that, a remarkably high average molecular weight can be achieved in an alignment film from a precursor that includes soluble polyimide (sPI). Substantial portion of the sPI is polyimide that is already imidized prior to carrying out the heating process to cause imidization reaction of other materials in the precursor. Simply put, the sPI includes polyimide that is capable of being dissolved in a solvent. While the constituent material of the sPI is PI, it may also include other materials such as the polyamic acid and/or polyamic acid ester. Accordingly, at least 50% or more of the sPI should be polyimide while the remaining portion of the sPI can be the polyamic acid or the combination of polyamic acid and polyamic acid ester.

The polyimide included in the sPI should have high molecular weight. To this end, the polyimide included in the sPI may be obtained a chemical imidization method. The chemical imidization method may require a final treatment where the precursor powder is heated briefly to temperatures near 300° C. (>Tg) to complete the imidization and remove traces of any solvent. Unlike the thermal imidization process used during the formation of the alignment film, the reverse reaction characteristic of the polyamic acid is minimal in the chemical imidization process, and thus polyimide with very high molecular weight can be obtained. However, the chemical imidization process is not suitable for directly forming the alignment film as processes involved during the chemical imidization can damage the other components of the LCD device.

The solubility of the polyimide is a unique feature that allows to use pre-imidized material in the precursor for the alignment film. Of course, the polyimide included in the precursor mixture should be soluble in an organic solvent that is suitable for use during manufacturing an alignment film of LCD devices. For example, the polyimide in the precursor mixture has high solubility in solvents, such as N-methyl-2-pyrrolidone (NMP), butyl cellosolve (BCS) and a mixed solvent of NMP and BCS.

Also, the type of solvents for dissolving the precursor mixture greatly affects the imidization ratio as well as the molecular weight of the resulting polyimide in the alignment film. The overall imidization reaction involves a relatively weak base reacting with a non-protic anhydride to yield a strong protic acid. In general, more basic aprotic solvent enhances the forward reaction, which forms polyimide, and allows for the reverse reaction to occur at higher temperature. In this regards, dipolar amide solvent is preferred as, without hampering the solubility of the polyimide in the precursor mixture, a strong hydrogen bond between the carbonyl group and hydrogen of —COOH will make more portion of the polyamic acid and/or polyamic acid ester to imidized into polyimide.

Unlike the polyamic acid, which may experience the reverse reaction, the sPI in the precursor is simply dried and largely remains as the polyimide during the heating process for imidization of the other precursor materials. Thus, using the sPI in the precursor allows to maintain the molecular weight of the alignment film without much loss even after the imidization process for other precursor materials. In other words, an alignment film with higher average molecular weight for improved anchoring force can be obtained from the precursor comprising the sPI.

The sPI, which is used as the precursor for the alignment film, should include a photo-decomposable material that undergoes a photo-decomposition reaction upon UV irradiation. That is, the polyimide in the sPI as well as any other material to form the polyimide by the imidization reaction should include a photo-decomposable material. When the materials of the sPI having the photo-decomposable material is irradiated with the UV light, a photo-decomposition reaction involving cleavage of the ring structure of the photo-decomposable material occurs. This process generates cleaved byproducts with maleimide end. The main chains that remain extending straight along the polarized direction of the UV light facilitate alignment of the LC molecules.

In the present disclosure, cyclobutane is used as an example of the photo-decomposable material included in the material of the sPI may be cyclobutane. However, it should be appreciated that other photo-decomposable material may be included in the materials of the sPI so long as the included photo-decomposable material is able to provide PI chain with comparable molecular weight as the PI chain from the sPI with cyclobutane.

While the cyclobutane facilitates providing anisotropy in the alignment film, it tends to increase in the volume resistivity of the resulting alignment film following the UV irradiation. Undesirably high voltage holding ratio of the alignment film results in a low discharge rate of a residual DC after an application of the voltage to LC, which in turn causes DC image sticking problem.

In this regard, the inventors of the present disclosure recognize that the alignment film can be formed in a multi-layered structure to maximize the anchoring force without the DC image sticking problem. That is, the first portion of the alignment film, which is closer to the liquid crystal layer, has higher molecular weight than the second portion, which is positioned away from the liquid crystal layer. Also, the first portion includes cyclobutane while the second portion does not include cyclobutane. This way, the first portion of the alignment film can provide improved anchoring force by high imidization rate and a large average molecular weight of polyimide therein. The second portion of the alignment film can provides the low volume resistivity, serving as a discharge path for faster DC discharging capability of the alignment film.

Another issue involved in including the sPI in the precursor of an alignment film is the large molecular weight of the cleaved byproduct generated by the cleaving of the main polymer chain during the UV irradiation process. The cleaved byproduct refers to the cleaved portion of the polyimide chain that does not contribute to the anisotropy of the alignment film. Various undesirable effects caused by the cleaved byproduct remaining in the alignment film can be intensified due to the large molecular weight of the cleaved byproduct, especially in the LCD device employing the negative dielectric anisotropy LC.

To this end, the large molecular weight cleaved byproducts removal process can be performed on the alignment film with an organic solvent that is capable of removing the large molecular weight byproduct without breaking the main chain of the polyimide. Without the large molecular weighted cleaved byproduct, a multi-layered structure alignment film with improved anchoring force and improved DC discharging capability can be provided for the negative dielectric anisotropy LCD device.

Accordingly, an aspect of the present invention relates to a LCD device having a novel alignment film including a first portion and a second portion, each having different characteristics from each other. In an embodiment, the LCD device includes a common electrode and a pixel electrode for generating electric fields to control liquid crystal molecules. These electrodes are formed on either a first substrate or a second substrate. Each of the first and second substrates has an alignment film formed thereon, and a negative dielectric anisotropy liquid crystal layer is interposed between the alignment films of the two substrates. At least one of the alignment films on the substrate is formed from a precursor including the sPI. Thus, the alignment film formed form from the precursor that includes the sPI includes polyimide chain having a molecular weight of 100,000 Da or more. Accordingly, an alignment film with a high weight average molecular weight can be obtained. With the polyimide chain having a molecular weight of 100,000 Da or more, the alignment film can have a weight average molecular weight ranging from 10,000 to 15,000. Without limitation the weight average molecular weight also can be more than 15,000 Da.

Each of the alignment films has a first portion, which is positioned closer to the liquid crystal layer, and a second portion, which is further away from the liquid crystal layer. The first portion is formed from a precursor including a photo-decomposable material while the second portion is formed from a precursor without the photo-decomposable material. Accordingly, following the UV irradiation on the alignment film, polyimide chains in the first portion can be configured to align the liquid crystal molecules of the liquid crystal layer. In contrary, the polyimide chains in the second portion does not react to the UV irradiation but the second portion has lower volume resistance than the first portion.

Such an alignment film with portions having different characteristics can be formed from a novel precursor mixture. Accordingly, in one aspect, the present invention relates to a liquid crystal display device with an alignment film that is formed from a precursor mixture that can form a multi-layered precursor structure. In an embodiment, the liquid crystal display device includes a pair of alignment films. A liquid crystal layer is interposed between the two alignment films. At least one of the alignment films is formed from a precursor mixture including a first precursor and a second precursor. The first precursor includes one or more materials with a photo-decomposable material. The second precursor includes one or more materials without the photo-decomposable material. The weight average molecular weight of the second precursor materials without the photo-decomposable material is higher than the weight average molecular weight of the first precursor materials with the photo-decomposable material. The difference between the weight average molecular weight of the first precursor and the second precursor enables phase separation between the two precursors such that the layer of first precursor is positioned over the layer of second precursor. That is, the materials with the photo-decomposable material can be positioned in the first precursor layer, which is closer towards the liquid crystal layer. The materials without the photo-decomposable material are in the second precursor layer, which is positioned away from the liquid crystal layer. In an embodiment, the first precursor includes polyimide with cyclobutane and polyamic acid with cyclobutane. The second precursor includes polyamic acid without cyclobutane.

Heating the multi-layered precursor structure causes imidization reaction in the first and second precursor layers, thereby forming the alignment film with a first portion and a second portion. The first portion of the alignment film is formed from the imidization reaction of the first precursor layer. The second portion is formed from imidization reaction of the second precursor layer. In this way, the first portion with remarkably high molecular weight polyimide with cyclobutane. The second portion includes polyimide without cyclobutane.

Upon a UV light irradiation, a photo-decomposition reaction occurs in the photo-decomposable material, cyclobutane. As such, the first portion is provided with an anisotropy to align the LC molecules whereas the second portion does not exhibit such anisotropy. While the second portion does not contribute much in providing alignment capability of the alignment film, the second portion exhibits a lower volume resistance than the first portion of the alignment film. Accordingly, the LCD device can be provided with an alignment film with a portion configured to provide strong anchoring force and another portion configured to serve as a discharging path for unwanted charges. Thus, both the AC image sticking problem and the DC image sticking problem can be solved.

In yet another aspect, a novel method of forming an alignment film is provided. First, each of a first substrate and a second substrate is applied with a solution including a precursor mixture dissolved in an organic solvent. The precursor mixture includes soluble polyimide (sPI) with a photo-decomposable material and polyamic acid without a photo-decomposable material. The photo-decomposable material included in the sPI may be cyclobutane. As such, the polyamic acid is free of cyclobutane. In the precursor mixture, the sPI with cyclobutane forms a first precursor layer while the polyamic acid without cyclobutane forms a second precursor layer. Imidization process is performed on the first and second precursor layers, thereby forming alignment films having a first portion and a second portion. The first portion is formed from the first precursor layer and the second portion is formed from the second precursor layer.

The alignment films are irradiated with UV light, thereby imparting the alignment capability in the alignment films. The UV irradiation generates cleaved byproducts. A first impurity removal process is performed on the alignment films by an organic solvent that is capable of removing the large molecular weight cleaved byproducts from the alignment film without breaking the main polyimide chains that provides anisotropy in the alignment film. A second impurity removal process (post-baking) is performed on the alignment films to remove ion impurities as well as residual cleave byproducts from the alignment films. A liquid crystal layer is sealed between the alignment film on the first substrate and the alignment film on the second substrate, and scribed to form a display panel (cell).

When the alignment film of the liquid crystal display device is formed in such processes, the liquid crystal display device can exhibit strong anchoring force, reduced optical defects such as uneven bright spots and AC/DC image sticking problems.

BRIEF DESCRIPTION OF THE DRAWINGS

The above and other aspects, features and other advantages of the present disclosure will be more clearly understood from the following detailed description taken in conjunction with the accompanying drawings.

DETAILED DESCRIPTION OF EMBODIMENTS

Figure 1A:
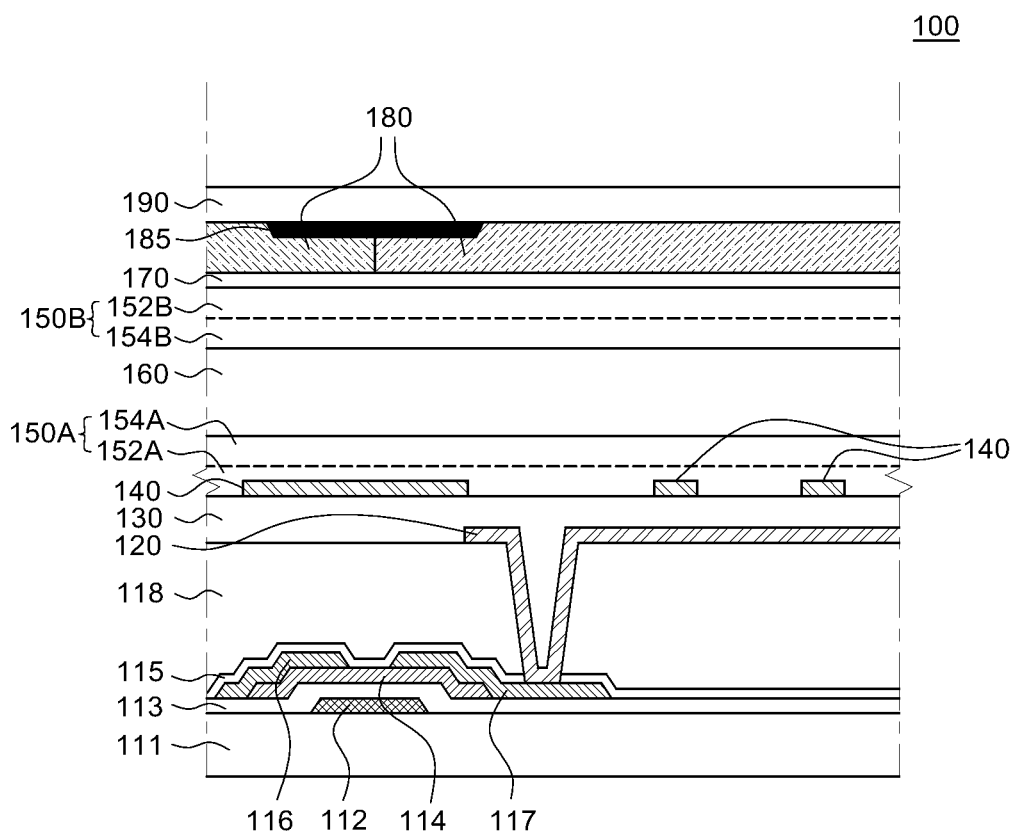
FIG. 1A is a schematic cross-sectional view showing an exemplary liquid crystal display device according to an embodiment of the present disclosure.

Various advantages and features of the present invention and methods accomplishing thereof will become apparent from the following description of embodiments with reference to the accompanying drawings. However, the present invention is not limited to exemplary embodiment disclosed herein but will be implemented in various forms. The exemplary embodiments are provided by way of example only so that a person of ordinary skilled in the art can fully understand the disclosures of the present invention and the scope of the present invention. Therefore, the present invention will be defined only by the scope of the appended claims.

Indicating that elements or layers are "on" other elements or layers include both a case in which the corresponding elements are just above other elements and a case in which the corresponding elements are intervened with other layers or elements.

In the drawings, size and thickness of each element are arbitrarily illustrated for convenience of description, and the present invention is not necessarily limited to those illustrated in the drawings. The same reference numerals indicate the same elements throughout the specification.

The components of various embodiments of the present invention can be partially or entirely bonded to or combined with each other and can be interlocked and operated in technically various ways as can be fully understood by an ordinary person skilled in the art, and the embodiments can be carried out independently of or in association with each other.

Hereinafter, various embodiments of the present invention will be described in detail with reference to the accompanying drawings.

FIG. 1A is a cross-sectional view provided for explaining a liquid crystal display device according to an exemplary embodiment of the present disclosure.

Referring to FIG. 1A, in a liquid crystal display device 100, a staggered thin-film transistor including a gate electrode 112, an active layer 114, a source electrode 116, and a drain electrode 117 are formed on a first substrate 111. To be specific, the gate electrode 112 is formed on the first substrate 111, and a gate insulating layer 113 is formed thereon. The active layer 114 is formed on the gate insulating layer 113. The source electrode 116 and the drain electrode 117 are electrically connected with the active layer 114. While the thin-film transistor in the exemplary embodiments of the present disclosure is described as having a staggered structure, it should be noted that the thin-film transistor in the embodiments may have various other structures such as a coplanar structure.

Further, FIG. 1A illustrates that a pixel electrode 120 is connected with the drain electrode 117 assuming that the thin-film transistor is a P-type thin-film transistor. However, if the thin-film transistor is an N-type thin-film transistor, the pixel electrode 120 may be connected with the source electrode 116.

On the thin-film transistor, a first protection layer 115 and a second protection layer 118 for protecting the thin-film transistor are formed. The pixel electrode 120 is formed on the second protection layer 118. The pixel electrode 120 is in contact with the drain electrode 117 through a contact hole of the second protection layer 118. An upper insulating layer 130 is formed so as to cover the pixel electrode 120. On the upper insulating layer 130, a common electrode 140 is formed. The second protection layer 118 is formed of an organic material such as photoacryl and used to increase an aperture ratio. The first protection layer 115 may be omitted.

In the present disclosure, both IPS mode and FFS mode LCD device will be referred to as the IPS type LCD device for simpler explanation. Since the LCD device 100 illustrated in FIG. 1A is an IPS type LCD device, the common electrode 140 is formed on the substrate 111 but not formed on the second substrate 190. In the exemplary LCD device 100 shown in FIG. 1A, the common electrode 140 is positioned above the pixel electrode 120. However, arrangement of the common electrode 140 and the pixel electrode 120 is not limited as such. Accordingly, the pixel electrode 120 may be positioned above the common electrode 140. Also, an electrode (not shown) may be formed under the common electrode for additional functionalities, such as touch sensing or lowering the resistance of the common electrode. Such an electrode may be positioned within an organic passivation layer formed of photoacryl. Also, the pixel electrode 120 may be formed on the same plane as the common electrode 140. Further, the common electrode 140 and the pixel electrode 120 may be arranged in a linear shape.

In some embodiments, the common electrode 140 and the pixel electrode 120 may be arranged in a zigzag shape having at least one or more bent portions, and a color filter 180 and a black matrix 185 of a second substrate 190 may be formed into a zigzag shape having at least one or more bent portions. Furthermore, the common electrode 140 or the pixel electrode 120 may be formed into a rectangular shape, and the common electrode 140 or the pixel electrode 120 may be formed in a linear shape or a zigzag shape having at least one or more bent portions.

On the common electrode 140, the liquid crystal layer 160 is interposed between a lower alignment film 150A and an upper alignment film 150B. While a negative dielectric anisotropy LC is preferred for the liquid crystal layer 160, it may be formed of a positive dielectric anisotropy liquid crystal layer. The alignment films (150A, 150B) are configured to set and maintain the initial alignment direction of LC of the liquid crystal layer 160.

The color filter 180, which may include red, green, and blue color filters, is formed under the second substrate 190. The black matrix 185 can be also formed at the underside of the second substrate 190. The black matrix 185 may be formed between the two color filters 180 to prevent mixing of colors. An over coating layer 170 may be interposed between the upper alignment film 150B and the color filter 180.

In this example, the lower alignment film 150A and the upper alignment film 150B include two portions. The first portion 154A of the lower alignment film 150A refers to the portion positioned towards the liquid crystal layer 160 while the second portion 152A refers to the portion positioned away from the liquid crystal layer 160. Similar to the lower alignment film 150A, the upper alignment film 150B also includes a first portion 154B that is closer to the liquid crystal layer 160 and a second portion 152B that is positioned away from the liquid crystal layer 160. The first portions (154A, 154B) may be in contact with the liquid crystal layer 160 while the second portions (152A, 152B) are not in contact with the liquid crystal layer 160.

The alignment films (150A, 150B) have a high weight average molecular weight, for instance weight average molecular weight ranging from 10,000 to 15,000. In both alignment films (150A, 150B), the first portions (154A, 154B) that are positioned towards the liquid crystal layer 160 are imparted with anisotropy. This is necessary for increasing the anchoring force of the alignment films (150A, 150B) and reducing the occurrences of the AC image sticking problem from the LCD device.

The second portions (152A, 152B) that are positioned away from the liquid crystal layer 160 should have a lower volume resistance in comparison to the corresponding first portions (154A, 154B) in the respective alignment films (150A, 150B). Having a low volume resistance than the first portions (154A, 154B) is important for the second portions (152A, 152B) as the second portions (152A, 152B) serve to discharge the charges accumulated in the alignment films (150A, 150B) and/or to suppress charges from being accumulated in the alignment film (150A, 150B) from the outset. The volume resistance of the second portions (152A, 152B), which is lower than the volume resistance of the first portions (154A, 154B) reduces the occurrences of DC image sticking from the LCD device 100.

The alignment films (150A, 150B) having the first portions (154A, 154B) and the second portions (152A, 152B) can be formed from a precursor mixture including a first precursor and a second precursor having a different weight average molecular weight from each other. The difference between the molecular weight of the first and second precursor materials facilitates formation of the first portions (154A, 154B) and second portions (152A, 152B) of the alignment film (150A, 150B).

In an embodiment, the first precursor of the precursor mixture is the sPI. As described above, the sPI includes polyimide with a photo-decomposable material. The molecular formula of the polyimide containing the photo-decomposable material is represented by the Chemical Formula 1.

[Chemical Formula 1]

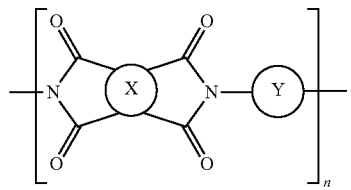

In Chemical Formula 1, n represents a natural number, X represents a photo-decomposable material that is sensitive to UV irradiation, and Y represents an aromatic hydrocarbon group having 2 or more rings.

As discussed above, the photo-decomposable material can be the cyclobutane having the following structure:

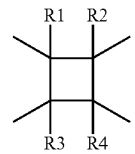

Here, each of R1, R2, R3, and R4 may be one or more selected from the group consisting of a hydrogen atom, a fluorine atom, a chlorine atom, a bromine atom, a phenyl group, an alkyl group having 1 to 6 carbon atoms, an alkoxy group having 1 to 6 carbon atoms, a vinyl group ($—(CH_2)_m$ $CH=CH_2$, $m=0\sim2$), and an acetyl group ($—(CH_2)_m—$ $C\equiv H$, $m=0\sim2$).

The aromatic hydrocarbon group has a structure as follows:

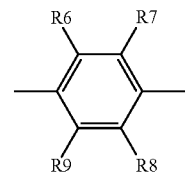

Here, each of R6, R7, R8, and R9 may be one or more selected from the group consisting of a hydrogen atom, a fluorine atom, a chlorine atom, a bromine atom, a phenyl group, an alkyl group having 1 to 6 carbon atoms, an alkoxy group having 1 to 6 carbon atoms, a vinyl group ($—(CH_2)_m$ $CH=CH_2$, $m=0\sim2$), and an acetyl group ($—(CH_2)_m—$ $C\equiv H$, $m=0\sim2$).

The polyimide represented by Chemical Formula 1 has high solubility in a solvent, such as N-methyl-2-pyrrolidone (NMP), butyl cellosolve (BCS) and a mixed solvent of NMP and BCS. When Y of the polyimide is aromatic hydrocarbon group having one ring, the polyimide will not have sufficient solubility to be used in the precursor mixture. Accordingly, Y of the polyimide should include an aromatic hydrocarbon group having at least two rings to increase the solubility so that it can be in the liquid-state at the room temperature.

It should be noted that the sPI can further include polyamic acid with a photo-decomposable material. Accordingly, in the present disclosure, the sPI with a photo-decomposable material refers to a combination of polyimide with the photo-decomposable material and a polyamic acid with the photo-decomposable material.

The second precursor of the precursor mixture is polyamic acid without a photo-decomposable material, which is represented by the Chemical Formula 2.

[Chemical Formula 2]

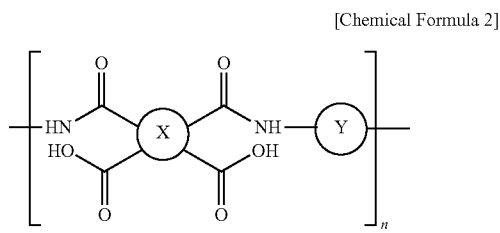

In Chemical Formula 2, X represents an aromatic hydrocarbon group having 2 or more rings, and Y represents an aromatic hydrocarbon group having one or more rings.

The aromatic hydrocarbon group has a structure as follows.

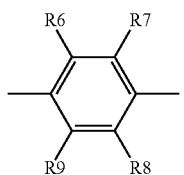

In Chemical Formula 2, each of R6, R7, R8, and R9 may be one or more selected from the group consisting of a hydrogen atom, a fluorine atom, a chlorine atom, a bromine atom, a phenyl group, an alkyl group having 1 to 6 carbon atoms, an alkoxy group having 1 to 6 carbon atoms, a vinyl group ($-(CH_2)_m CH=CH_2$, m=0~2), and an acetyl group ($-(CH_2)_m-C\equiv H$, m=0~2).

Figure 1B:
FIG. 1B is a schematic cross-sectional view illustrating an exemplary multi-layered alignment film of a liquid crystal display device according to an embodiment of the present disclosure.

FIG. 1B is a schematic cross-sectional view showing the precursor mixture having an exemplary structure of a multi-layered precursor 150 for forming an alignment film. It should be noted that any one of the lower alignment film 150A and the upper alignment film 150B can be formed form the multi-layered precursor 150. The first portion (154A, 154B) is primarily formed from imidization reaction of the first precursor layer 154 while the second portion (152A, 152B) is primarily formed from an imidization reaction of the second precursor layer 152.

The precursor mixture (5 parts by weight) is dissolved in an organic solvent (95 parts by weight), and applied on the first substrate 111 and/or the second substrate 190. The precursor mixture on the substrate (110, 190) can be dried. On the substrate, the multi-layered precursor structure 150 is formed due to the weight average molecular weight difference between the constituent materials of the first and second precursors.

The weight average molecular weight difference between the substances of the first and second precursors is sufficient so long as it causes phase separation between first and second precursors to form the first precursor layer 154 and the second precursor layer 152 within a desired time period. The larger the difference between the weight average molecular weight of the precursors, the faster the phase separation will occur in the solution of precursor mixture dissolved in the organic solvent. However, to facilitate the proper positioning of the first precursor layer 154 and the second precursor layer 152, the substances in the first precursor, that is the polyimide a the photo-decomposable material and polyamic acid with a photo-decomposable material (e.g., cyclobutane), should have lower molecular weight than the substance(s) of the second precursor, which is the polyamic acid without a photo-decomposable material (e.g., cyclobutane).

In the embodiments of the present disclosure, the polyimide in the sPI has an aromatic hydrocarbon group having 2 or more rings as Y so that it has a higher weight-average molecular weight than the conventional polyamic acid having a short Y. Accordingly, polyamic acid without the cyclobutane should have an aromatic hydrocarbon group having 2 or more rings as X in order for the sPI with a photo-decomposable material to be positioned towards the liquid crystal layer 160.

As time passes, the polyamic acid without cyclobutane moves towards the substrate (110, 190) while the sPI with cyclobutane floats above the polyamic acid without cyclobutane. As such, the precursor mixture is gradually separated into the first precursor layer 154, which comprises polyimide with cyclobutane and polyamic acid with cyclobutane, and the second precursor layer 152, which comprises polyamic acid without cyclobutane. In this way, a multi-layer precursor structure 150 for the alignment film (150A, 150B) is formed.

Since the formation of the first precursor layer 154 and second precursor layer 152 depends on the molecular weight of their constituent materials, the boundary between the first precursor layer 154 and the second precursor layer 152 may not be perfectly clear. Accordingly, some polyamic acid without cyclobutane may remain in the first precursor layer 154 and some sPI may remain in the second precursor layer 152. However, the division of the first precursor layer 154 and the second precursor layer 152 should be sufficiently achieved such that the first portion (154A, 154B) and the second portion (152A, 152B) should be primarily formed of the first precursor layer 154 and the second precursor layer 152, respectively. As will be described in further detail below, the configuration of the precursor mixture allows to reduce the polyamic acid remaining in the first portion (154A, 154B) of the alignment film (150A, 150B), which is highly reactive with the alkenyl single of the negative type liquid crystal.

After the precursor mixture dispersed on a substrate settles and phase separated into the first precursor layer 154 and the second precursor layer 152, imidization process is carried out by performing a heat treatment. The heat treatment can be carried out at a temperature ranging from 100° C. to 350° C., more preferably at about 200° C. to 300° C., and more preferably at about 200° C. to 250° C. In one embodiment, the heat treatment is performed to the first precursor layer 154 and second precursor layer 152 at the same time at a temperature of about 200° C.

In some embodiments, the multi-layered structure 150 may be heated gradually to about 200° C. to 250° C., depending on the stability and Tg of the polyimide. Alternatively, the multi-layered structure 150 of precursor mixture solution may be heated and held at several intermediate temperature ranges, each ranges for a certain period of time, and cooled to room temperature. For example, the multi-layered structure 150 of precursor mixture solution can be heated to 100° C. and held for a period, heated from 100° C. to about 200° C. and held for a next period, and cooled down to room temperature.

Figure 1C:
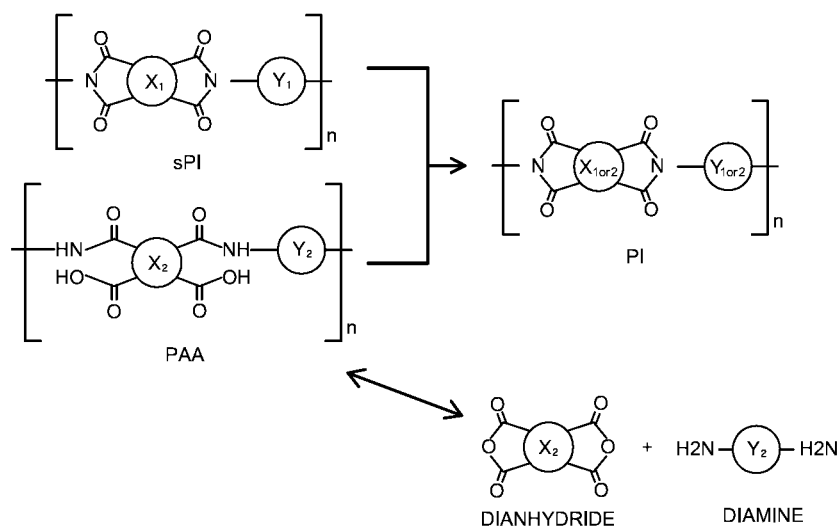
FIG. 1C is a schematic diagram showing a precursor used in forming an exemplary alignment film of a liquid crystal display device according to an embodiment of the present disclosure.

When the polyimide with cyclobutane in the first precursor layer 154 is heat-treated, the polyimide of the first portion (154A, 154B) can maintain much of its original molecular weight. Even though some polyamic acid reverse back to diamine and dianhydride as illustrated in FIG. 1C, a high imidization ratio can be achieved in first portion (154A, 154B) of the alignment film (150A, 150B) by using the polyimide as the precursor for the alignment film (150A, 150B).

Figure 1D:
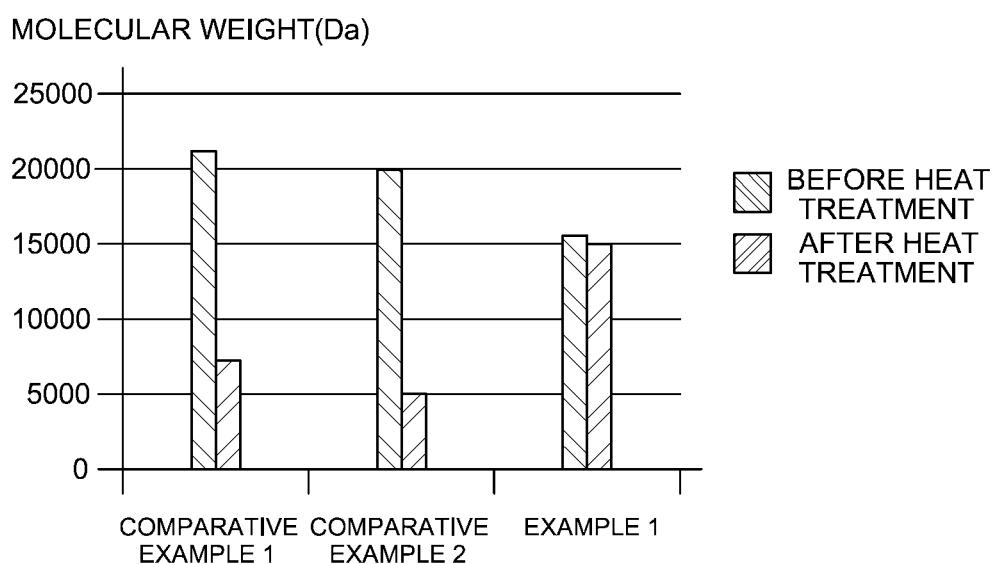
FIG. 1D is a graph showing a comparison of molecular weight of alignment films formed from different precursor materials.

FIG. 1D is a graph illustrating a comparison of number average molecular weight of resulting alignment films before and after the heat-treatment for imidization.

Example 1

A precursor mixture was applied on a substrate by an ink-jet printing method and dried to form an alignment film. Then, the alignment film was heated at a temperature of 200° C. so as to be imidized.

Comparative Example 1

An alignment film was formed in the same process as was in the Example 1 by using a precursor, which include polyamic acid with cyclobutane.

Comparative Example 2

An alignment film was formed in the same process as was in the Example 1 by using a precursor, which includes polyamic acid without cyclobutane.

In Comparative Examples 1 and 2, substantial portion of the polyamic acid are decomposed into diamine and dianhydride. Thus, low-molecular weight materials, which does not contribute much to the anchoring force, is formed. In the Comparative Example 1, the weight average molecular weight of the alignment film was reduced down to about 7,000 Da from the weight average molecular weight of slightly over 20,000 Da following the heat treatment. Similarly, after the heat treatment, the weight average molecular weight of the alignment film was reduced down to about 5,000 Da from the weight average molecular weight of about 20,000 Da in the Comparative Example 2.

Polyamic acid or polyamic acid ester can be dissolved in an organic solvent even when they do not include an aromatic hydrocarbon group having 2 or more rings. In contrast, conventional polyimide does not dissolve in an organic solvent. The polyimide in the sPI of the present disclosure, however, includes an aromatic hydrocarbon group having 2 or more rings as Y to increase its solubility in an organic solvent. Using the sPI, the weight average molecular weight of the alignment film was slightly above 15,000 Da before the heat treatment, and remained substantially the same at about 15,000 Da even after the heat treatment.

In the precursor mixture, the amount of the sPI with photo-decomposable material should account for at least 30% or more. As described above, polyimide with a photo-decomposable material should account for at least 50% or more of the sPI. As a ratio of the polyimide with the photo-decomposable material is increased in the sPI, the imidization ratio of the first portion (154A, 154B) can be increased. For example, the imidization rate of 40% to 99%, more preferably 50% to 100%, more preferably at least 80% or more can be achieved in the first portion (154A, 154B) of the alignment film (150A, 150B). With high imidization ratio in the first portion (154A, 154B), the weight average molecular weight in the first portion (154A, 154B) of the alignment film 150 can be maintained high, thereby increasing the anchoring force with respect to the liquid crystal layer 160. This, in turn, suppresses the AC image sticking issue in the LCD device 100.

The second portion (152A, 152B) of the alignment film (150A, 150B) is not formed from the sPI of the first layer 154, but rather the second portion (152A, 152B) of the alignment film (150A, 150B) is formed from the second precursor layer 152, which includes polyamic acid without cyclobutane. Upon imidization of the polyamic acid without cyclobutane produces polyimide without cyclobutane in the second portion (152A, 152B) of the alignment film (150A, 150B). Without the cyclobutane, cleaving of the polymer chain does not occur in the second portion (152A, 152B) of the alignment film (150A, 150B) during the UV irradiation process. This helps in maintaining the thickness of the alignment film.

Also, the absence of cyclobutane allows the second portion (152A, 152B) to exhibit a lower volume resistance than the first portion (154A, 154B). For instance, the first portion (154A, 154B) of the alignment film (150A, 150B) has a volume resistance of about 1.0·1015 Ω·cm or more, but the second portion of the alignment film has a volume resistance of about 1.0·1013-14 Ω·cm. Accordingly, the second portion of the alignment film facilitates faster discharging to help reduce the DC image sticking problem from the LCD device 100.

The precursor mixture may further include polyamic acid ester without the photo-decomposable material to increase the strength of the alignment film. For instance, polyamic acid ester without the photo-decomposable material, which has higher weight average molecular weight than the substances of the materials of the first precursor (e.g., sPI), can be included in the precursor mixture. In other words, the second precursor includes the polyamic acid ester without the photo-decomposable material so that the second precursor layer 152 forming the second portion (152A, 152B) of the alignment film (150A, 150B) includes the polyamic acid ester without the photo-decomposable material. However, an excessive amount of polyamic acid ester should be avoided as it can result in poor adhesion and/or weakening of the alignment film on the substrate. Further, significantly more time will be required for imidization process of the multi-layered precursor 150 including the polyamic acid ester thereby lowering the production yields of the LCD device 100.

Figure 2A:
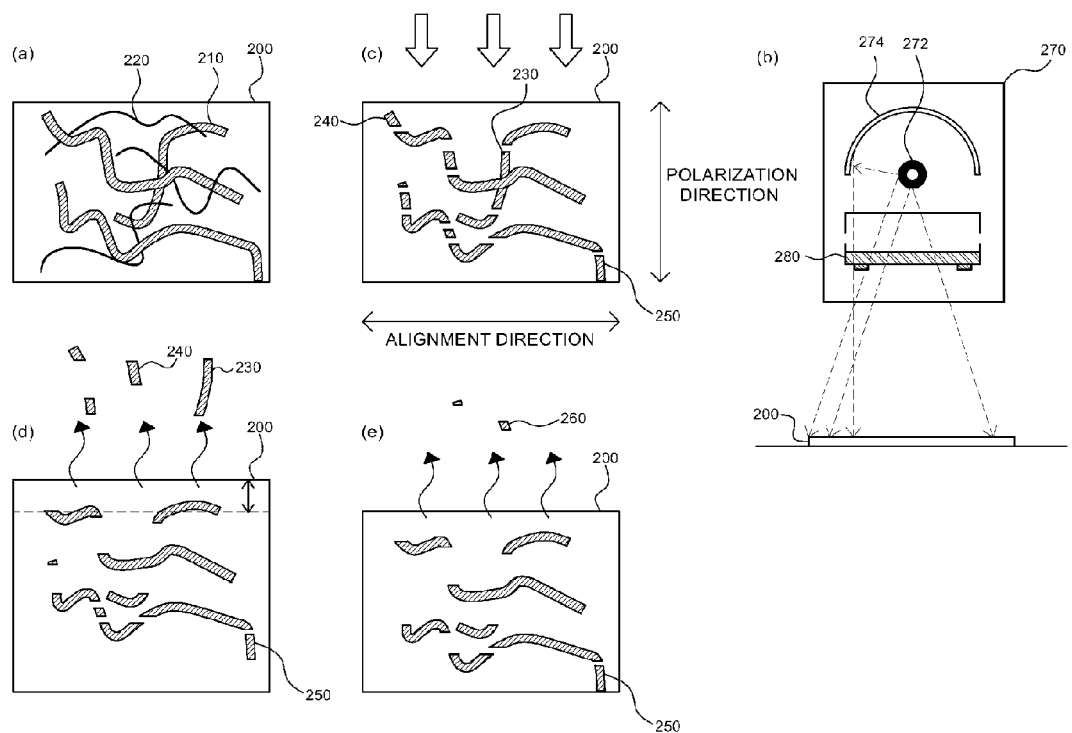
FIG. 2A is a schematic illustration explaining the state of an alignment film of the exemplary liquid crystal display device according to an embodiment of the present disclosure.

FIG. 2A, parts (a) to (e) illustrate residual decomposed material of an alignment film of a LCD device according to the exemplary embodiment of the present disclosure.

FIG. 2A, part (a) illustrates a state of the multi-layered precursor structure, which is formed by applying a precursor mixture including sPI 210 with a photo-decomposable material and polyamic acid 220 without a photo-decomposable material. Initially, sPI 210 with a photo-decomposable material and the polyamic acid 220 without a photo-decomposable material are mixed in a single layer. After certain period (e.g., about 100-150 seconds), the polyamic acid 220 without the photo-decomposable material having a higher weight average molecular weight than the weight average molecular weight of the sPI 210 sinks under the sPI 210, thereby forming the multi-layered precursor structure described above. Then, the heat-treatment is performed on this multi-layered precursor structure to cause imidization reaction to form the multi-layered alignment film having a first portion and a second portion.

UV irradiation process is carried out on the alignment film 200 by an UV irradiation device 270 as depicted in FIG. 2A, part (b). UV light emitted from a lamp 272 is reflected off of a mirror 274 surrounding the lamp 272 is passed through a polarizer 280 before reaching the alignment film 200. The polarized UV light may have a wavelength in a range of from about 200 nm to about 300 nm, preferably between 230 nm to 250 nm.

FIG. 2A, part (c) illustrates the state of the multi-layered alignment film 200 following the UV irradiation in a polarization direction perpendicular to an alignment direction. As shown, the main chain of the polyimide in the multi-layered alignment film 200 is cleaved by the polarized UV light. The main chain of the polyimide oriented in a direction perpendicular to the polarization direction remains and forms anisotropy of the multi-layered alignment film 200. The cleaved byproducts of the main polyimide chain are denoted as the cleaved byproducts 230, 240, and 250 in FIG. 2A, part (c).

FIG. 2A, part (d) illustrates the state of the multi-layered alignment film 200 following a first impurity removal process with a lactate-based organic solution. In the first impurity removal process, the cleaved byproducts 230, 240 and 250, having relatively high molecular weight, are as well as the medium or low molecular weight cleaved byproducts are removed from the alignment film 200 by the lactate-based organic solution. The decomposed byproducts generated from the photo-decomposable material (e.g., cyclobutane) may also be removed by the first impurity removal process. The first impurity removal process should be carried out with a lactate-based organic solution as it is particularly useful in removing the cleaved byproducts having high molecular weight (e.g., greater than 10,000 Da).

More specifically, the lactate-based organic solution temporarily swells the surface of the alignment film 200 and increases the roughness of the alignment film 200. The average height of the alignment film 200 is also increased. The polyimide in the alignment film 200 is not dissolved by the lactate-based organic solution, but is only swollen by the lactate-based organic solution inserted between the chains of the polyimide. This makes it easy to remove the high molecular weight byproduct from the alignment film 200.

Here, the lactate-based organic solution may include one or more of methyl lactate, ethyl lactate, n-propyl lactate and n-butyl lactate. Further, the lactate-based organic solution may be mixed with deionized (DI) water. The lactate-based organic solution is ethyl lactate. Ethyl lactate has a low volatility in comparison to methyl lactate and has a low molecular weight in comparison to n-propyl lactate or n-butyl lactate.

FIG. 2A, part (d) illustrates the status of the alignment film 200 following the second impurity removal process, which is performed by post-baking the alignment film 200 after the first impurity removal process. In the second impurity removal process, residual cleaved byproducts 260, which are mostly low-molecular weight parts remaining in the alignment film 200, are evaporated. Also, the decomposed byproducts generated from the photo-decomposable material (e.g., cyclobutane) are also removed from the alignment film 200. Further, the heat from the process restructures the surface of the alignment film 200.

Figure 2B:
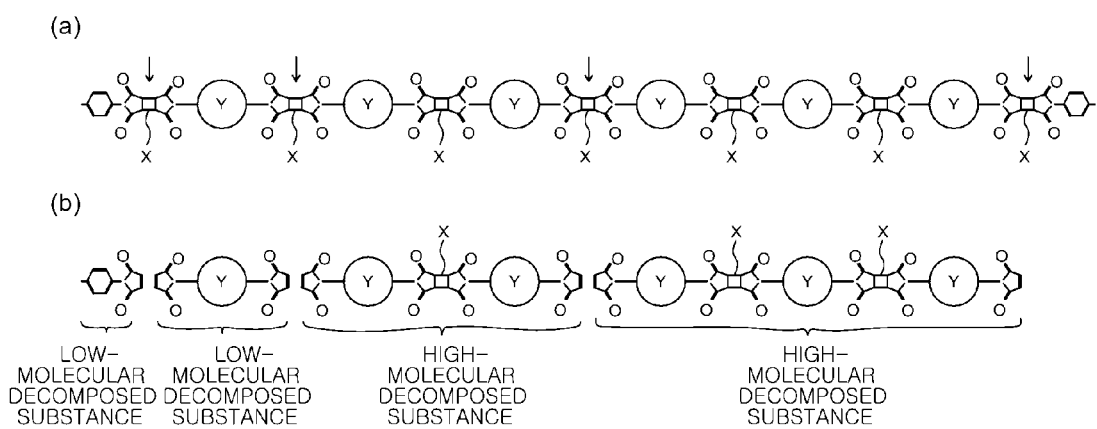
FIG. 2B illustrates schematic diagrams provided for explaining cleaved byproducts in an exemplary alignment film a liquid crystal display device according to an embodiment of the present disclosure.

FIG. 2B, parts (a) and (b) illustrate the state of the polyimide chain in the multi-layered alignment film 200 before and after the UV irradiation. FIG. 2B, part (a) illustrates the main chain of the polyimide containing cyclobutane as X and an aromatic hydrocarbon group having 2 or more rings as Y. When the polyimide of the multi-layered alignment film of the present disclosure is irradiated with UV light, the cyclobutane in the polyimide chain reacts with the UV light and is decomposed such that cleaved byproducts with maleimide end are generated. FIG. 2B, part (b) illustrates cleaved parts of the polyimide main chain. The cleaved parts from the main chain may have different molecular weight. Unlike the conventional alignment film formed without the sPI, the use of the sPI in the precursor mixture allows to achieve high molecular weight of the polyimide in the alignment film 200. Starting from the polyimide with molecular weight of 100,000 Da or more, the molecular weight of the cleaved parts can also be quite high.

As shown in FIG. 2B, part (b), some cleaved parts may have a benzene ring without Y or only a single Y, resulting in a low-molecular weight cleaved parts. Some cleaved parts may contain two or more Y, resulting in a high-molecular weight cleaved parts.

As described above, the combination of the first impurity removal process using the lactate-based organic solvent and the second impurity removal process through the post-baking treatment removes the low to high-molecular weight cleaved byproducts as well as the photo-decomposed byproducts from the alignment film 200.

Figure 2C:
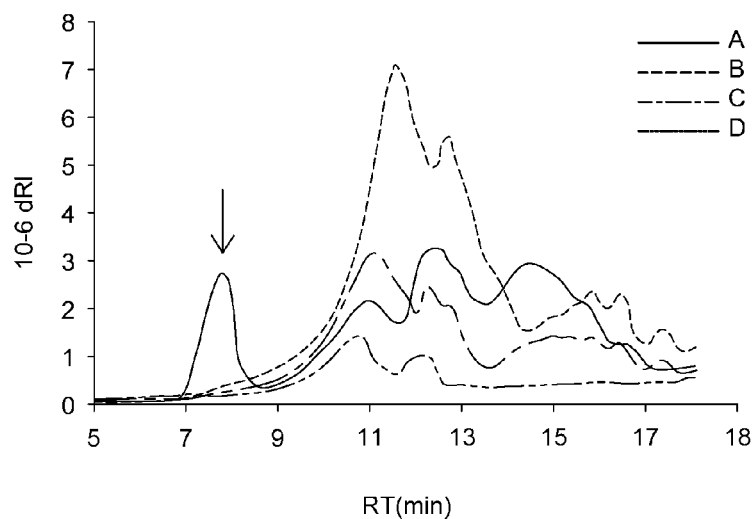
FIG. 2C is a graph provided for explaining a result of gel permeation chromatographic (GPC) analysis of substances decomposed and extracted from alignment films.

FIG. 2C is a graph showing the comparison of gel permeation chromatographic analysis results between the alignment film formed from the sPI including precursor mixture and the alignment films formed from the conventional precursor without the SPI. The X axis of the graph represents the retention time (RT) and the Y axis represents an amplitude (10-6 dRI) of a detected signal. The results shown in the graph of FIG. 2C were obtained by using GPC20002 manufactured by Waters System as a device and KD803-801 manufactured by Shodex as a column, by placing 8 substrates of 6.5×10 cm2 as samples in a tray, dipping the substrates in 10 ml of dimethylformamide (DMF), leaving them for 5 minutes, collecting the DMF, and conducting a gel permeation chromatographic analysis. A gel permeation chromatographic detector detects from high-molecular weight molecules to low-molecular weight molecules in sequence, and thus the molecules detected at RT of 7 to 9 minutes have higher molecular weight than the molecules detected at the later time.

A line A indicates measured molecular weights of the sample obtained from the alignment film that is formed by using a precursor including sPI. Lines B, C, and D indicate measured molecular weights of the samples obtained from the alignment films formed by using conventional polyimide precursors, namely a polyamic acid, polyamic acid ester, and a mixture of a polyamic acid and polyamic acid ester, respectively. As shown in FIG. 2C, a peak is not detected from the lines B, C, and D at RT of 7 to 9 minutes, but a peak is detected from the line A at RT of 7 to 9 minutes. Therefore, it can be ascertained that the alignment film formed using the precursor including the sPI contains chains having a molecular weight of 100,000 Da or more. On the contrary, alignments films formed using the conventional precursor (i.e., without the sPI) do not contain a chain with a molecular weight as high as 100,000 Da.

Figure 2D:
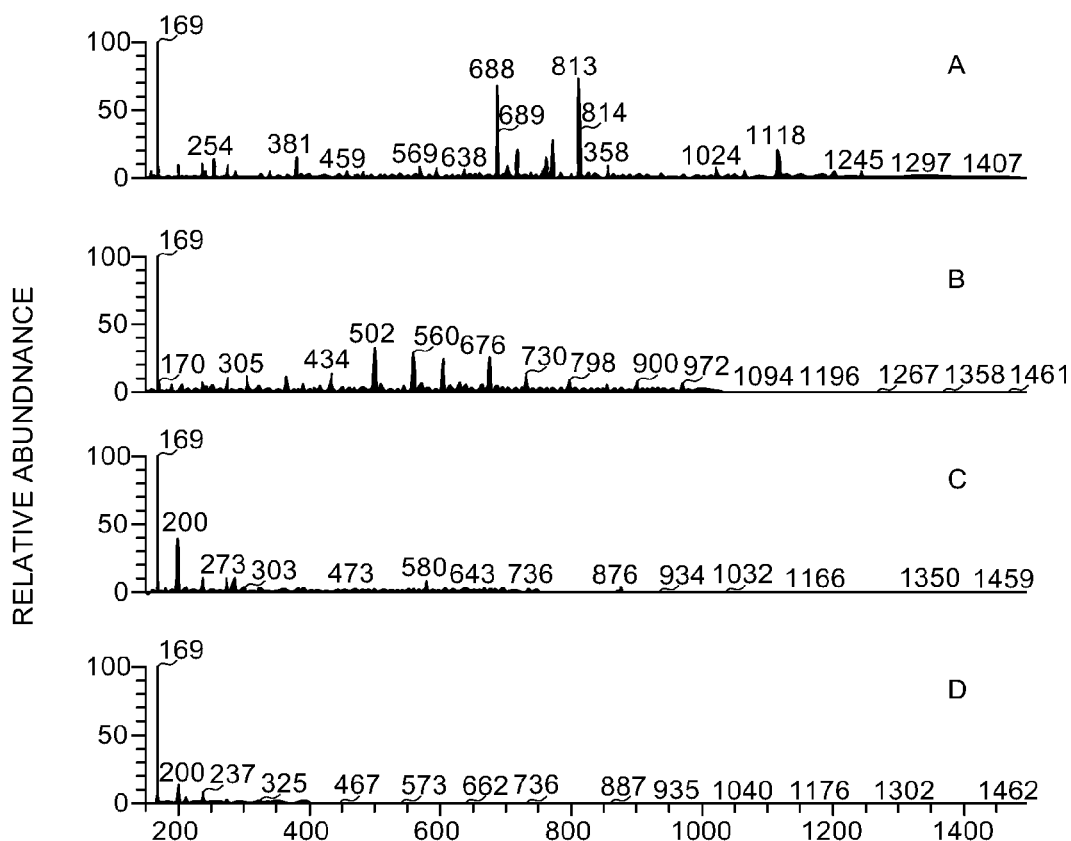
FIG. 2D is a graph provided for explaining a result of liquid chromatographic-mass spectrometric (LC-MS) analysis of substances decomposed and extracted from alignment films.

FIG. 2D is a graph provided for explaining a result of liquid chromatographic-mass spectrometric analysis of substances decomposed and extracted from an alignment film of a liquid crystal display device according to an exemplary embodiment of the present disclosure. The line A indicates measured molecular weights of a sample obtained by decomposing an alignment film formed using the precursor including sPI. Lines B, C, and D indicate measured molecular weights of the samples obtained by decomposing alignment films formed using a polyamic acid, polyamic acid ester, and a mixture of a polyamic acid and polyamic acid ester as a precursor, respectively. No peak is detected from the lines B, C, and D at a mass-to-charge ratio (m/z) of 800 or more, but a peak is detected from the line A at a mass-to-charge ratio of 800 or more. Since a mass-to-charge ratio of 800 or more is detected, it can be seen that the alignment film of the present invention has a higher-molecular weight chains that was not detected form other conventional alignment film.

Figure 3:
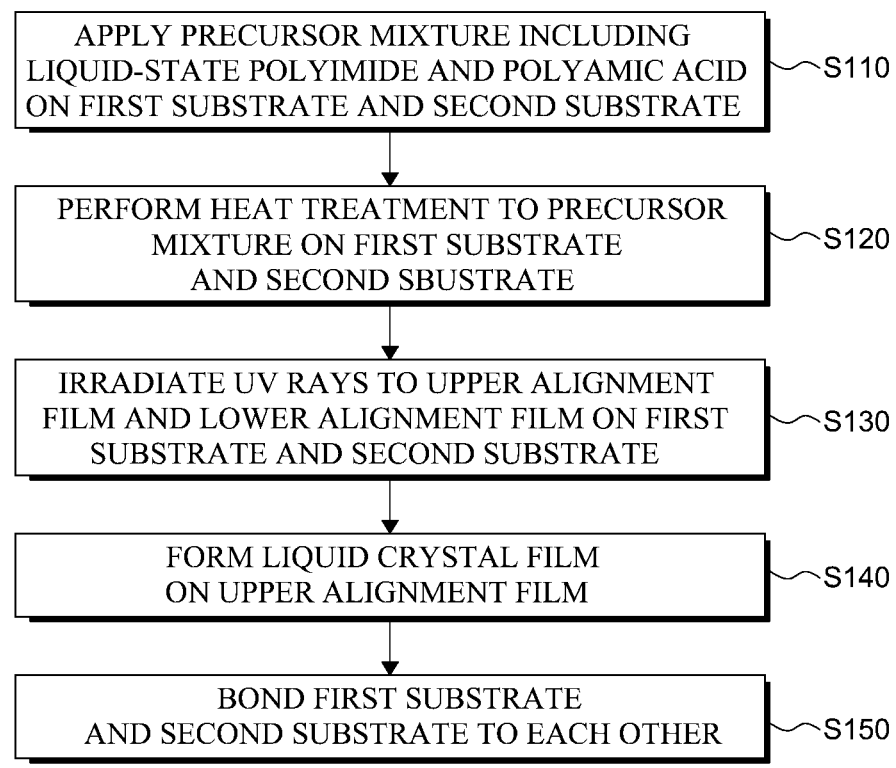
FIG. 3 is a flowchart showing an exemplary method of manufacturing a liquid crystal display device according to an embodiment of the present disclosure.

FIG. 3 is a flowchart showing an exemplary method of manufacturing a liquid crystal display device according to an embodiment of the present disclosure. In S110, at least one of the substrates of a LCD device is coated with a solution of precursor mixture dissolved in an organic solvent. Within the coating solution, the precursor mixture may be 5 parts by weight and the organic solvent may be 95 parts by weight. The precursor mixture includes the soluble polyimide (sPI) with a photo-decomposable material and the polyamic acid without a photo-decomposable material. Here, the at least some polyimide with the photo-decomposable material included in sPI may have molecular weight of 100,000 Da or more.

The solution with the precursor mixture is dried on the substrate such that the mixture is phase separated into the first precursor layer of SPI with the photo-decomposable material and the second precursor layer of polyamic acid without the photo-decomposable material. As described before, sPI is not entirely formed of polyimide but it also includes polyamic acid with the photo-decomposable material. The polyamic acid without the photo-decomposable material needs to have higher weight average molecular weight than the materials in the sPI such that the first precursor layer of sPI sits above the second precursor layer of polyamic acid without the photo-decomposable material. The photo-decomposable material may be cyclobutane.

In S120, a heating process is performed on the above mentioned multi-layered precursor structure to cause imidization of the polyimide precursors therein. That is, both the first precursor layer and the second precursor layer are heated at a temperature of about 200° C. In the first precursor layer, the polyimide of the sPI is simply cured by the heat while the polyamic acid with cyclobutane is imidized to form polyimide with cyclobutane, thereby forming the first portion of the alignment film. In the second precursor layer, the polyamic acid without the cyclobutane is imidized into polyimide without the cyclobutane, thereby forming the second portion of the alignment film. Accordingly, the first portion of the multi-layered alignment film will be mainly formed of polyimide with cyclobutane. The second portion of the multi-layered alignment film will include polyimide without the cyclobutane. The imidization ratio in the first portion is higher than the imidization ratio in the second portion of the alignment film due to the inclusion of pre-imidized polyimide in the first precursor layer.

In S130, the multi-layered alignment film is irradiated with UV light to give anisotropy. The UV light is polarized in a direction perpendicular to an alignment direction, and may have a wavelength in a range of from about 200 nm to about 300 nm. In a more preferred embodiment, the wavelength of the UV light may be between about 240 nm to about 270 nm, and more preferably between about 250 nm to 260 nm, and more preferably between about 254 nm to 257 nm. When the polyimide with the photo-decomposable material is irradiated with UV light, a photo-decomposition reaction of the cyclobutane occurs, causing cleavage in the main chain of the polyimide.

In this process, cleaved byproducts having a maleimide end is generated. The higher the molecular weight of the cleaved byproducts, greater the magnitude of negative impact it has in the alignment performance. Thus, it is imperative that such high molecular weight cleaved byproducts to be removed from the alignment film, especially from the first portion that is positioned towards the liquid crystal layer. However, the high molecular weight of the cleaved byproducts makes it extremely difficult to remove them from the alignment film.

As such, the cleaved byproducts is removed from the alignment film by two-step impurity removal process. The first impurity removal process is performed by chemically treating the surface of the alignment film with a proton type organic solvent. Among the proton type organic solvent, the lactate-based organic solvent is particularly optimized in removing the large molecular weight byproduct. Unlike IPA (isopropyl alcohol), PGMEA (propylene glycol monomethyl ether), NMP and Acetone, the lactate-based organic solvent does not affect the main chain of the polyimide remaining in the alignment film for the anisotropy. The lactate-based organic solution temporarily swells the surface the alignment film. This facilitates easier removal of the large molecular weight cleaved byproduct from the alignment film. Non-proton type solvent, such as NMP, Acetone, GBL (gamma-butyrolactone) and DMF dissolves the main chain of the polyimide, thus cannot be used in removing the high molecular weight byproduct.

In the second impurity removal process, post-baking treatment is performed on the alignment film. This process removes ion impurities and also evaporates low molecular weight byproduct from the alignment film. In addition, the second impurity removal process reorganizes the alignment film surface that was swollen during the first impurity removal process, thereby increasing the roughness of the alignment film surface.

Then, liquid crystal is placed on the above described multi-layered alignment film (S140), and sealed between the first and a second substrates (S150).

In a liquid crystal display device according to an exemplary embodiment of the present disclosure includes a multi-layered alignment film. The multi-layered alignment film is formed from a precursor mixture including soluble polyimide (sPI) with a photo-decomposable material and polyamic acid without a photo-decomposable material. The first portion of the multi-layered alignment film, which is positioned towards the liquid crystal layer, is formed from the sPI. The high molecular weight of sPI used in the precursor provides high weight average molecular weight in the first portion after the heating treatment, leading to longer main polyimide chain and more interaction sites in the first portion after the photo-alignment process. Accordingly, the first portion of the alignment film can provide improved anchoring force to suppress the AC image sticking problem.

The second portion of the multi-layered alignment film, which is positioned away from the liquid crystal layer, is formed from the polyamic acid without the photo-decomposable material. Without the photo-decomposable material, the second portion of the alignment film can exhibit low volume resistance, which can effectively discharge and/or prevent overly accumulating charges in or near the alignment film. Accordingly, the second portion of the alignment film suppresses the DC image sticking problem from the LCD device.

If the polyamic acid remains in the first portion of the alignment film 150, it can react with a negative dielectric anisotropy LC, hampering the reliable operation of the liquid LCD device using the negative dielectric anisotropy LC. More specifically, polar end-group, such as carboxylic acid can become radicals when exposed to heat or light. The radicals react with the negative dielectric anisotropy LC single (e.g., Alkenyl group), thereby causing yogore and other types of defects. However, the configuration of the multi-layered alignment film forces the polyamic acid that failed to be imidized as well as the diamine and acid anhydride generated by the reverse reaction of the polyamic acid to largely remain in the second portion. Because they are positioned away from the liquid crystal layer, undesired reaction with alkenyl single of the negative dielectric anisotropy LC can be suppressed.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

What is claimed is:

1. A liquid crystal display device comprising:
a liquid crystal layer between a pair of alignment films, wherein the pair of alignment films are formed from a solution of a precursor mixture having first and second precursors dissolved in an organic solvent, the first precursor with a photo-decomposable material and the second precursor without the photo-decomposable material, wherein the second precursor has a higher weight average molecular weight than a weight average molecular weight of the first precursor, wherein the first precursor includes polyimide with the photo-decomposable material, wherein the polyimide in the first precursor is a compound represented by Chemical Formula 1:

[Chemical Formula 1]

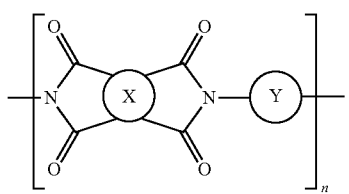

where X represents cyclobutane, Y represents an aromatic hydrocarbon group having 2 or more rings, and n represents a natural number no less than 1,
wherein the second precursor includes polyamic acid without the photo-decomposable material and the polyamic acid without the photo-decomposable material is a compound represented by Chemical Formula 2:

[Chemical Formula 2]

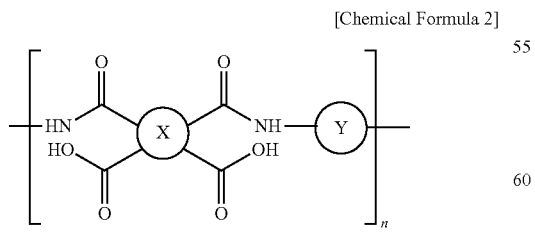

where X represents an aromatic hydrocarbon group having 2 or more rings, Y represents an aromatic hydrocarbon group having 1 or more rings, and n represents a natural number no less than 1.

2. The liquid crystal display device according to claim 1, wherein the first precursor further includes polyamic acid with the photo-decomposable material.

3. The liquid crystal display device according to claim 1, wherein the solution includes 5 parts by weight of the precursor mixture dissolved in 95 parts by weight of the organic solvent.

4. The liquid crystal display device according to claim 3, wherein the first precursor accounts for at least 30% of the precursor mixture.

5. The liquid crystal display device according to claim 4, wherein the polyimide with the photo-decomposable material accounts for at least 80% of the first precursor.

6. The liquid crystal display device according to claim 5, wherein the photo-decomposable material is cyclobutane.

7. A liquid crystal display device comprising:
a liquid crystal layer between a pair of alignment films, wherein the pair of alignment films are formed from a solution of a precursor mixture having first and second precursors dissolved in an organic solvent, the first precursor with a photo-decomposable material and the second precursor without the photo-decomposable material, wherein the second precursor has a higher weight average molecular weight than a weight average molecular weight of the first precursor, wherein the first precursor includes polyimide with the photo-decomposable material, wherein the polyimide in the first precursor is a compound represented by Chemical Formula 1:

[Chemical Formula 1]

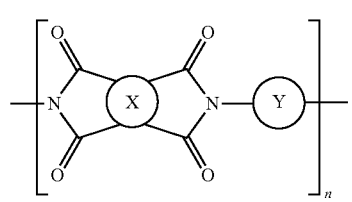

where X represents cyclobutane, Y represents an aromatic hydrocarbon group having 2 or more rings, and n represents a natural number greater than 1,
wherein the second precursor includes polyamic acid without the photo-decomposable material, and the polyamic acid without the photo-decomposable material is a compound represented by Chemical Formula 2:

[Chemical Formula 2]

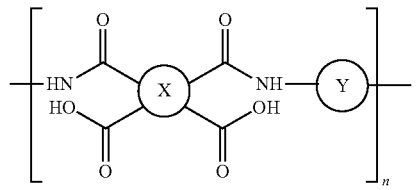

where X represents an aromatic hydrocarbon group having 2 or more rings, Y represents an aromatic hydrocarbon group having 1 or more rings, and n represents a natural number greater than 1.

8. The liquid crystal display device according to claim 1, wherein the pair of alignment films include a first layer and a second layer, wherein the first layer is formed from the first precursor and the second layer is formed from the second precursor.

9. The liquid crystal display device according to claim 8, wherein the volume resistance of the first layer is higher than a volume resistance of the second layer.

10. The liquid crystal display device according to claim 9, wherein the volume resistance of the first layer is $1.0 \cdot 10^{15}$ $\Omega \cdot cm$ or higher.

11. The liquid crystal display device according to claim 8, wherein a weight average molecular weight of the second layer is higher than a weight average molecular weight of the first layer.

12. The liquid crystal display device according to claim 8, wherein an imidization ratio of the first layer is more than 80%.

13. The liquid crystal display device according to claim 8, wherein the liquid crystal layer is a negative dielectric anisotropy liquid crystal layer.

14. The liquid crystal display device according to claim 8, wherein the first layer has a polyimide chain with a molecular weight of 100,000 Da or more.

\* \* \* \* \*